US007916011B2

(12) United States Patent
Marguet et al.

(10) Patent No.: US 7,916,011 B2
(45) Date of Patent: Mar. 29, 2011

(54) TIRE MONITOR SYSTEM HAVING TIRE VALVE ANTENNA

(75) Inventors: Emmanuel Marguet, Arcon (FR); Adrian Page, Antrim (GB)

(73) Assignee: Schrader Electronics Ltd., Antrim (GB)

( * ) Notice: Subject to any disclaimer, the term of this patent is extended or adjusted under 35 U.S.C. 154(b) by 653 days.

(21) Appl. No.: 11/656,152

(22) Filed: Jan. 22, 2007

(65) Prior Publication Data
US 2008/0074251 A1 Mar. 27, 2008

Related U.S. Application Data

(60) Provisional application No. 60/761,101, filed on Jan. 23, 2006.

(51) Int. Cl.
B60C 23/00 (2006.01)
B60C 23/02 (2006.01)
(52) U.S. Cl. .......... 340/447; 73/146.5; 340/445
(58) Field of Classification Search .......... 340/442–447; 73/146.5–146.8; 116/34; 152/152.1, 415
See application file for complete search history.

(56) References Cited

U.S. PATENT DOCUMENTS

| 3,806,869 | A | * | 4/1974 | Davis, Jr. | 340/447 |
| 4,734,674 | A | * | 3/1988 | Thomas et al. | 340/447 |
| 5,677,667 | A | * | 10/1997 | Lesesky et al. | 340/431 |
| 5,955,949 | A | * | 9/1999 | Cocita | 340/572.1 |
| 5,955,979 | A | * | 9/1999 | Knudsen | 341/118 |
| 6,005,480 | A | | 12/1999 | Banzhof et al. | 340/447 |
| 6,163,255 | A | * | 12/2000 | Banzhof et al. | 340/447 |
| 6,318,768 | B1 | * | 11/2001 | Gehres | 285/368 |
| 6,722,409 | B1 | * | 4/2004 | Martin | 152/427 |
| 6,765,482 | B2 | * | 7/2004 | Yamagiwa et al. | 340/442 |
| 6,888,449 | B2 | * | 5/2005 | Lin et al. | 340/442 |
| 7,237,439 | B1 | * | 7/2007 | Rutherford et al. | 73/732 |
| 2002/0066506 | A1 | * | 6/2002 | Wilson | 152/152 |
| 2004/0046649 | A1 | * | 3/2004 | Sanchez et al. | 340/443 |
| 2004/0070494 | A1 | | 4/2004 | Lin et al. | 340/445 |

FOREIGN PATENT DOCUMENTS

DE 10148876 A1 4/2003

OTHER PUBLICATIONS

Notification of Transmittal of the International Search Report and the Written Opinion of the International Searching Authority, or the Declaration, PCT/US2007/001725, Applicant Schrader Electronics LTD mailed on Jun. 29, 2007.

* cited by examiner

*Primary Examiner* — Benjamin C Lee
*Assistant Examiner* — Sigmund Tang
(74) *Attorney, Agent, or Firm* — J. A. Thurnau, Esq.; P. N. Dunlap, Esq.

(57) ABSTRACT

A tire monitor system includes a tire monitor sensor unit that has a tire pressure detector, a coupler and a tire valve. The tire valve operates as an antenna to transmit tire data from the tire pressure detector. The coupler provides a capacitive coupling that removably couples the tire pressure detector and the tire valve. The coupler includes two metal layers separated by a dielectric layer. The two metal layers may be formed by the tire valve and a connection tube.

17 Claims, 4 Drawing Sheets

US 7,916,011 B2

TIRE MONITOR SYSTEM HAVING TIRE VALVE ANTENNA

CROSS REFERENCE TO RELATED APPLICATION

This application claims priority to U.S. Provisional Patent Application Ser. No. 60/761,101, filed Jan. 23, 2006, entitled TIRE MONITOR SYSTEM HAVING TIRE VALVE ANTENNA, which is also incorporated herein by reference.

BACKGROUND OF THE INVENTION

1. Field of the Invention

The present invention relates generally to tire monitor systems, more particularly to tire monitor system sensors and methods employing a tire valve antenna, and specifically to coupling of such antennas with sensor unit circuitry.

2. Description of the Prior Art

A tire monitor system monitors various tire conditions such as tire pressure and/or temperature and informs a driver of such conditions, particularly excessively high or low pressures or excessively high temperatures. A radio frequency (RF) transmission is typically used to remotely transmit tire pressure information to a central vehicle computer or the like, which in turn, conveys the information to the driver, via a dashboard display, warning light, audible warning signal, or the like. Some tire monitor system sensor units include a tire pressure detector deployed in conjunction with a more-or less typical tire valve. The tire pressure detector typically includes one or more sensors such as a pressure sensor, an RF transmission circuit, a control circuit, a power source such as a battery, etc. The pressure sensor measures tire pressure and produces a signal related to the measured tire pressure. The signal may be used by the control circuit to produce tire condition information. Some tire pressure sensor units are secured to a wheel rim using the tire valve. Examples of such "snap-in" tire pressure sensor units are disclosed in U.S. Pat. Nos. 6,005,480 and 6,163,255.

To transmit tire condition information, conventional tire pressure sensor units may employ an external planar antenna, or the like. An external antenna increases the weight of the tire pressure sensor unit. The battery is often the heaviest component in the tire pressure sensor unit. Because of the forces of rotation of the wheel and tire pressure sensor unit, the tire pressure sensor unit is carefully designed to balance the weight of other components against the battery. An external planar antenna mounted on the tire pressure sensor unit may impair the balance and require that the tire pressure sensor unit be designed around the bulk of the antenna as well as the weight of the battery. Further, the resultant tire pressure sensor unit may not be as compact and/or lightweight as is desirable.

Problematically, the signal transmitted by a sensor having an antenna disposed inside a tire mounted on a wheel is greatly attenuated. Therefore, some existing tire pressure sensor units employ the tire valve stem as an antenna. However, such sensors usually integrate the tire valve and the sensor housing, or at least permanently secure the tire pressure sensor housing and stem together and/or typically permanently wire the sensor circuitry to the valve stem. Therefore, the entire sensor and valve stem unit must be replaced as a single unit, when only the relatively inexpensive tire valve needs to be replaced.

SUMMARY

The present invention is directed to apparatus, systems and methods which provide a tire monitor sensor unit that includes a tire pressure detector, a coupler and a tire valve, wherein the tire valve operates as an antenna to transmit tire data from the tire pressure detector and the coupler preferably provides a substantially capacitive coupling that removably couples the tire pressure detector and the tire valve. The capacitive coupler may include two metal layers separated by a dielectric layer. The two metal layers may be formed by the tire valve and a connection tube in accordance with various embodiments of the present invention.

By way of example, various embodiments of a tire monitor sensor unit include a tire pressure detector that detects tire pressure and generates tire data including pressure in the tire. A tire valve is operable in these embodiments to receive the tire data from the tire pressure detector and transmit the tire data as an antenna. Preferably, a coupler removably couples the tire pressure detector and the tire valve. This coupler preferably comprises two metal layers, disposed adjacent to one another. Preferably, the two metal layers are formed by the tire valve and a connection tube, or the like. The coupler may provide capacitive coupling. In such a case the two metal layers are separated by a dielectric layer, which might be air. Alternatively, the dielectric layer might be a plastic coating disposed on at least one of the tire valve and the connection tube. To prove the coupling the connection tube and the tire valve may be inserted into an opening integrally formed with an enclosure of the tire pressure detector. Embodiments of a tire monitor sensor unit of the present invention may also, or alternatively, employ inductive coupling and/or a direct connection between the two metal layers. Over time a direct connection so employed may become a capacitive or inductive coupling. Some embodiments of the present invention might employ a tab extending from the tire pressure detector to provide a first metal layer and the tire valve as a second metal layer. The tab and the tire valve may be, at least initially, directly coupled and may be secured together using a conductive fastener, such as a screw.

An embodiment of a method for practicing the present invention might include providing a conductive connection tube and inserting the connection tube into an opening defined by a housing of a tire pressure detector. The conductive tube is preferably electrically connected to circuitry of the tire pressure detector. A stem of a tire valve may be inserted into the opening so that the connection tube surrounds the tire valve stem, thereby coupling the tire pressure detector circuitry and the stem of the tire valve. A tire valve so disposed may be used as an antenna to transmit tire data. As noted above coupling between the connection tube and the stem may be at least one of capacitive coupling, inductive coupling, and a direct connection, and wherein the coupling is a direct connection between the connection tube and the stem and the direct connection may become a capacitive coupling over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Embodiments of a tire monitor sensor unit include a tire pressure detector and a tire valve. The tire valve may operate as an antenna to transmit tire data. In that case, the tire pressure sensor unit might transmit tire data via the tire valve. Such a tire valve antenna is electrically coupled to the tire pressure detector for transmission of the tire data. In accordance with the present invention, the tire valve is preferably removably coupled to the tire pressure detector using a capacitive or inductive coupling. The coupling may be formed using the tire valve, a connection tube and a dielectric layer separating the tire valve and the connection tube. Taking advantage of this indirect coupling, the tire valve may be separated from the tire pressure detector for replacement and/or cleaning. The tire data may be transmitted to a remote receiver via the tire valve antenna. The receiver may be associated with a display device which provides the tire data to a driver in various formats or other warning systems.

Figure 1:
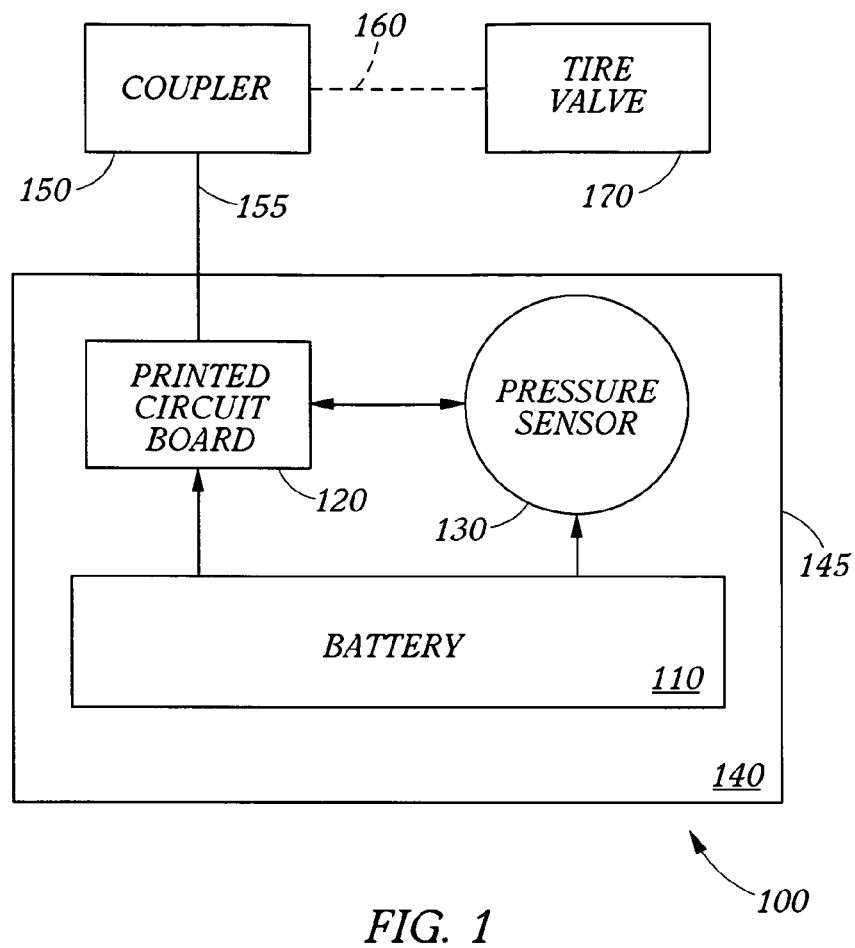
FIG. 1 is a block diagram of a tire monitor sensor unit.

FIG. 1 is a block diagram illustrating an embodiment of a tire monitor sensor unit 100. Sensor unit 100 includes tire pressure detector 140 coupled to tire valve 170. Coupler 150 connects tire valve 170 and tire pressure detector 140. Tire valve 170 preferably operates as an antenna.

Tire pressure detector 140 of the illustrated embodiment includes battery 110, printed circuit board 120 and pressure sensor 130. In other embodiments, pressure sensor 130 may be integrated with printed circuit board 120. Tire pressure detector 140 may include other sensors such as a temperature sensor, an acceleration sensor, a rotation sensor, a speed sensor, etc. Printed circuit board 120 includes circuitry that is necessary to perform tire pressure monitoring. For example, in one embodiment, printed circuit board 120 includes a microcontroller, a power management circuit, a radio frequency (RF) transmission circuit, a memory, etc. Battery 110, printed circuit board 120 and pressure sensor 130 are preferably contained within enclosure 145.

Battery 110 provides power to printed circuit board 120 and pressure sensor 130 for operation. Various types of batteries may be used as long as it is suitable for use with tire pressure detector 140. Other energy sources may be substituted as well, such as the batteryless system disclosed in U.S. Pat. Provisional Application Ser. No. 60/798,751, filed May 8, 2006.

Figure 4:
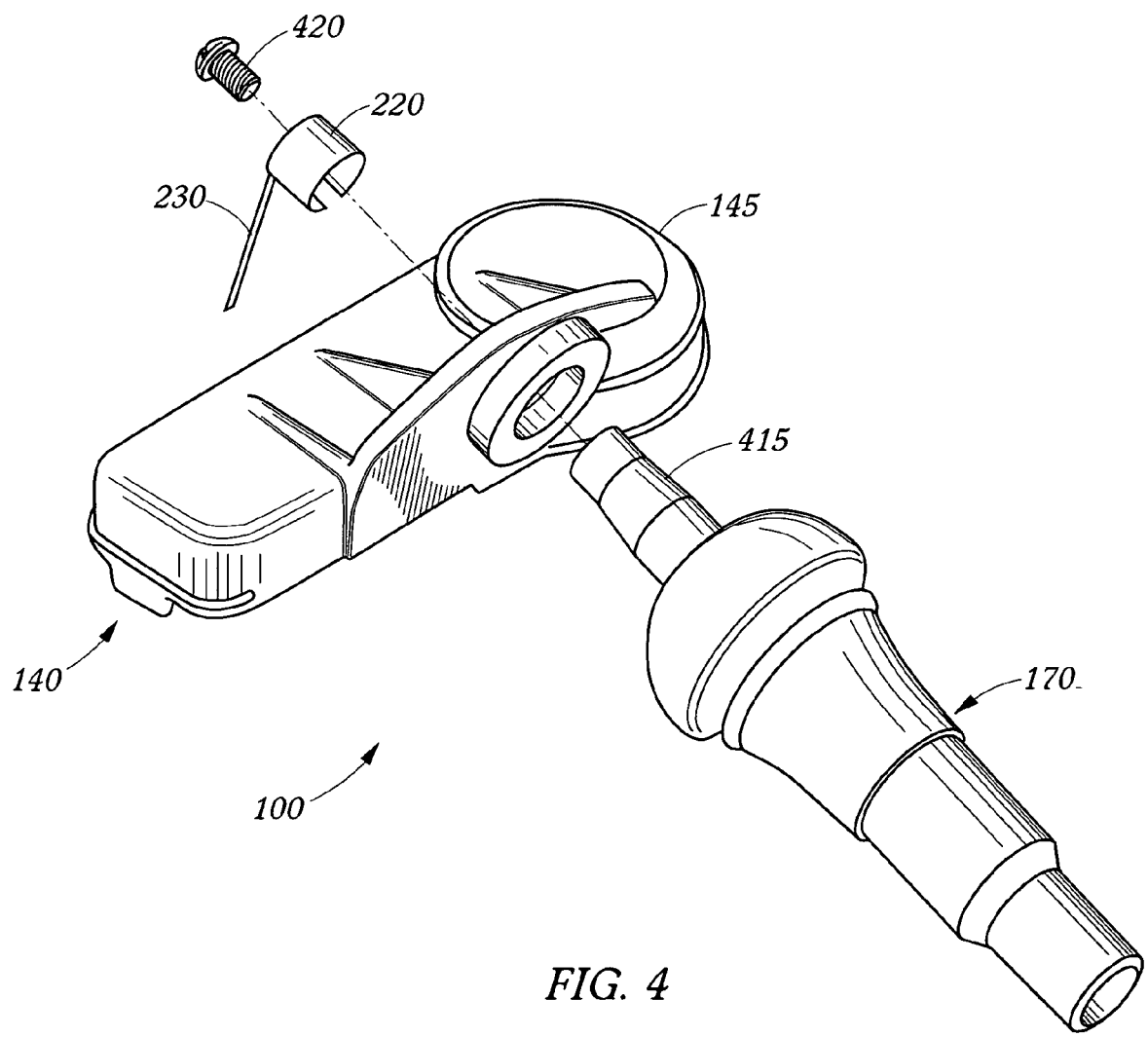
FIG. 4 is a exploded perspective view of a tire sensor unit adapted to employ the present capacitive coupling.
Figure 5:
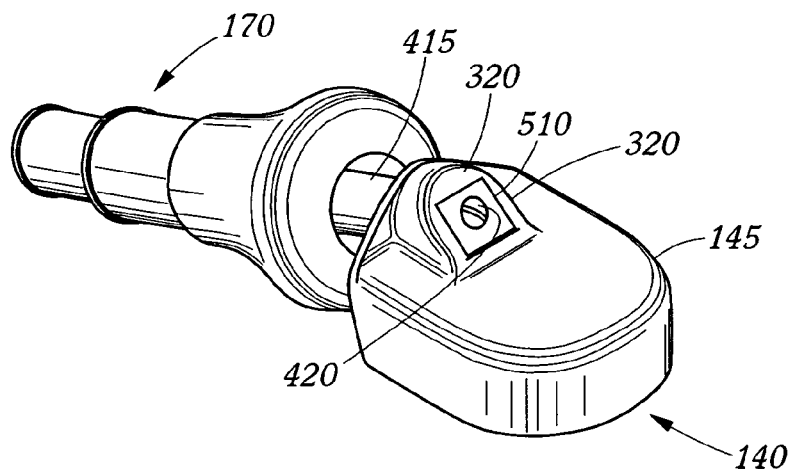
FIG. 5 is a perspective view of an assembled tire sensor unit employing the present capacitive coupling.

Battery 110 is generally heavier than other circuit elements of pressure monitor 140. In certain embodiments, in the interior of enclosure 145 of tire pressure detector 140, battery 110 may be located at the lower center of enclosure 145 and printed circuit board 120 may be disposed adjacent the top of the enclosure, such a sensor unit is shown in FIG. 5. In other embodiments the battery may be disposed to one side of the tire valve and its weight might be offset by the weight of the printed circuit board and associated potting material, disposed on the opposite side of the tire valve, a sensor unit having such an arrangement is shown in FIG. 4. In still other embodiments, the physical arrangement of the components of tire pressure detector 140 may be varied to satisfy other design goals. Regardless, the arrangement of the components of detector 140 will allow components outside of enclosure 145, such as coupler 150 to have relatively easy access to printed circuit board 120.

The circuitry formed on printed circuit board 120 operates to convert a tire pressure measurement from pressure sensor 130 to tire data representative of the pressure measurement. The tire data may be binary in nature for convenient processing by digital logic circuits, but other signals and processing techniques may be substituted. The binary data may be used to control a radio circuit, such as by frequency modulating a carrier signal to convey the information contained in the tire data. The radio transmission may be carried out in accordance with standardized protocol, employing more-or-less standardized frequencies, such as 315 MHz. The tire data might also include identification information for tire pressure detector 140 as well as tire pressure information.

The tire data may be transmitted via tire valve antenna 170 to a central control unit (not shown) located in a vehicle. The central control unit receives the tire data and performs functions such as automatic determination of a tire location, a display of the tire pressure, presentation of a warning sound for a low tire pressure, etc. To receive and transmit the tire data to the central control unit, the tire valve antenna is electrically coupled to tire pressure detector 140. Coupler 150 connects tire valve antenna 170 to printed circuit board 120.

Connection 155 between coupler 150 and printed circuit board 120 may not be limited to any specific implementation as long as the tire data is transmitted from printed circuit board 120 to coupler 150. For instance, a conductor such as an electrical wire, lead or tab may extend from coupler 150 to printed circuit board 120 or from printed circuit board 120 to coupler 150, as will be described below in greater detail in conjunction with FIGS. 2 through 5. On the other hand, connection 160 between coupler 150 and tire valve antenna 170 may be required to be suitable for dual functions of tire valve antenna 170, i.e., operating a tire valve and an antenna. To properly function as a tire valve, tire valve 170 should be separable from, and reattachable to, tire pressure detector 140 upon need and should control the inflation and deflation of the tire. To properly function as an antenna, tire valve 170 preferably operates as an electrical device, which may be driven by an amplifier, to perform data transfer with tire pressure detector 140. If tire valve 170 is coupled to tire pressure detector 140 with wired and/or fixed connectors such as an electrical wire, the connectors may have to be removed and/or damaged to separate tire valve 170 from the pressure detector 140.

Figure 2:
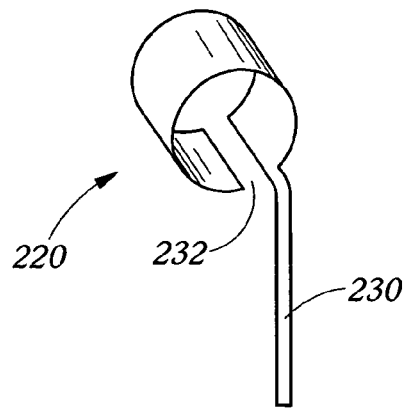
FIG. 2 is one embodiment of a connection tube forming in part a coupler for use with the tire monitor sensor unit of FIG. 1.
Figure 3:
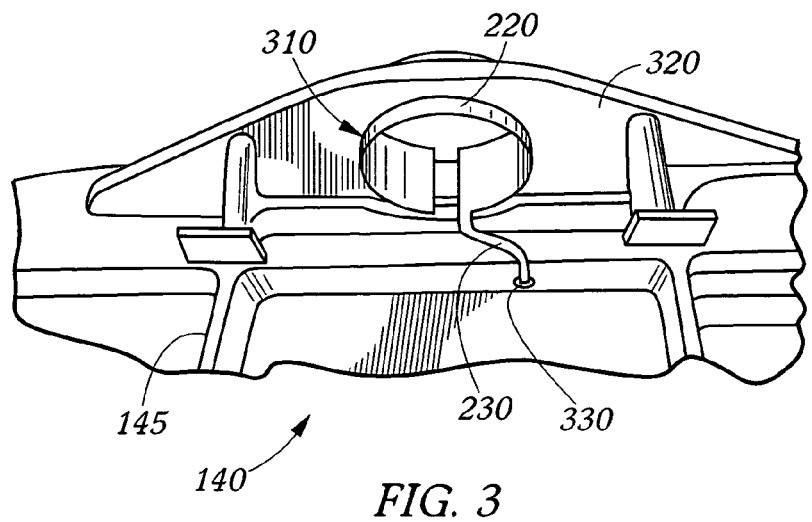
FIG. 3 illustrates disposition of the connection tube of FIG. 2 in an opening defined in a frame extending from a tire sensor unit enclosure.

FIG. 2 is a perspective view of an embodiment of connection tube 220, which may be used in accordance with the present invention. As will be described in greater detail below, connection tube 220 and tire valve 170 engage mechanically and electrically and form coupler 150. Since conventional tire valve stems are generally cylindrical in shape, connection tube 220 has a cylindrical shape such that it may wrap around a tire valve stem upon their engagement. Connection tube 220 forms an open loop with gap 232 defined by the surround portion of the connection tube. Connection tube 220 is easily rolled to fit in an opening formed integrally with or adjacent an enclosure of a tire pressure detector, which will be shown in greater detail in conjunction with FIG. 3 below. In other embodiments, connection tube 220 may form a closed loop. Connection tube 220 is sized for frictional engagement with either an inside diameter or an outside diameter, such as the outside diameter of a tire valve stem or the inside diameter of an opening, such as shown in FIG. 3 and discussed below. Connection tube 220 is preferably made from an electrically conductive material, such as an electrically conductive metal, aluminum, brass, copper, etc. A pin, tab or the like 230 may extend from the surround portion of the connection tube to connect connection tube 220 to printed circuit board 120 of FIG. 1, so that tire data may be conducted from printed circuit board 120 to connection tube 220.

FIG. 3 illustrates an embodiment of the disposition of connection tube 220 in sensor unit 100. In FIG. 3, connection tube 220 is inserted into opening 310 formed in frame 320 of tire pressure detector 140. Connection tube 220 may be pushed by force into opening 310 of frame 320. Connection tube 220 then is retained in opening 310 of frame 320 by frictionally engaging an inner surface of opening 310. In other embodiments, connection tube 220 may be molded over stem 415 of the tire valve antenna 170 or into the interior wall of the opening 310. Various other insertion and/or retention methods are contemplated within the scope of the present invention.

The embodiments of tire pressure detector 140 shown in FIGS. 2 through 5 have enclosure 145 that defines frame 320 protruding perpendicularly relative to a top surface of enclosure 145. Frame 320 may be integrally formed with enclosure 145. Frame 320 includes opening 310 to receive both connection tube 220 and tire valve 170. Pin 230 preferably extends through aperture 330 formed on enclosure 145 and connects printed circuit board 120. In other embodiments, pin 230 might run along the side of enclosure 145 and back to printed circuit board 120. Alternatively, other means such as a tag or tab (510 in FIG. 5) extending upward from the circuit board 120 may be used in place of the pin 230. Tag 510 may be secured to the end of connection tube 220 by screw 420 or the like, as shown in FIGS. 4 and 5.

The shape and size of opening 310 and connection tube 220 may change, depending on the design of a tire valve, a tire pressure detector and a tire monitor sensor unit. Opening 310 is illustrated as having a circular shape, but various other shapes are possible. The size of opening 310 may be determined based on a diameter of a tire valve stem. Tire valve 170 is inserted into opening 310, as shown in FIGS. 4 and 5. In this embodiment, tire valve 170 may be a snap-in type, as discussed above, but it is not limited thereto. For example the tire valve and tire valve stem may be secured to a wheel using nuts and washers.

FIG. 4 illustrates one embodiment of the coupler 150 formed by connection tube 220 and tire valve 170. Connection tube 220, tire valve 170 and their engagement in opening 310 provide coupling between tire pressure detector 140 and tire valve 170, particularly tire valve stem 415. This coupling may utilize the capacitive, inductive or a combination of the capacitive and inductive properties of the connection tube and tire valve stem materials. Capacitive coupling may be implemented with two metals separated by a dielectric material. Connection tube 220 and tire valve stem 415 provide two metal layers. Suitable material may be provided as a dielectric layer between connection tube 220 and tire valve stem 415. Advantageously, capacitive coupling is able to provide electrical connection without attached and fixed mechanical structures. As a result, the capacitive coupling may allow tire valve 170 to be removable and perform the dual functions of a tire valve and an antenna as discussed above. As best seen in the exploded view of FIG. 4, embodiments of the present invention call for tire valve stem 415 to be inserted into opening 310 of frame 320 in which connection tube 220 is disposed. Tire valve 170 may be secured in place by screw 420 being threaded into the end of tire valve stem 415.

Figure 6:
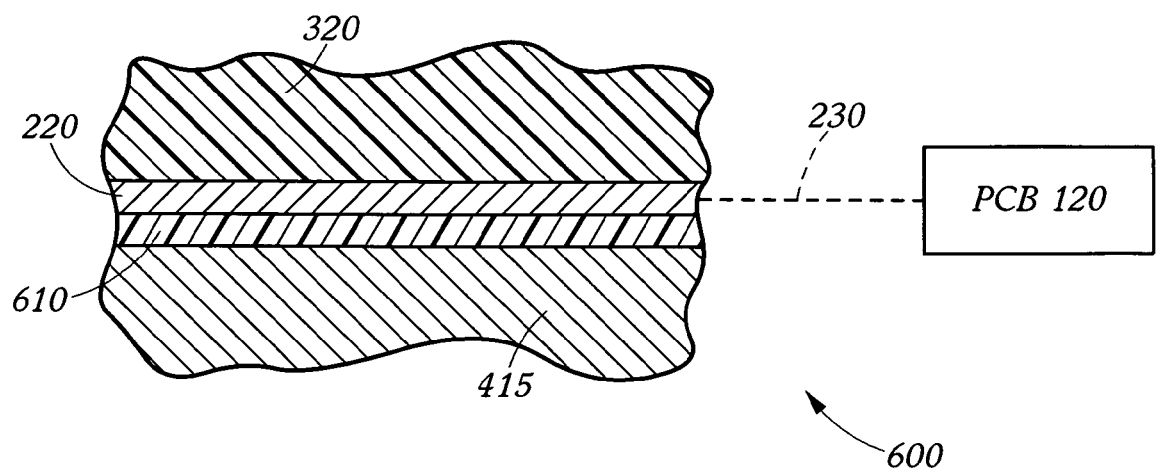
FIG. 6 illustrates an embodiment of a capacitive coupling formed with a multilayer structure.

FIG. 6 illustrates an embodiment of implementation of the capacitive coupling. In FIG. 6, the capacitive coupling includes a multilayer structure 600 formed by tire valve stem 415, connection tube 220, and dielectric material 610. In FIG. 6, the multilayer structure 600 is illustrated in fragmented cross section. Referring to FIGS. 2 through 5, connection tube 220 is disposed in opening 310 of frame 320 and electrically connected, such as via pin 230, to printed circuit board 120, then tire valve stem 415 is inserted into opening 310, and thus through connection tube 220. Tire valve stem 415 may be made from metal such as aluminum, copper, an alloy of metals such as brass, or any other electrically conducting material. Connection tube 220 is also preferably made from similarly conductive material. Upon the insertion of tire valve stem 415 and connection tube 220 into opening 310, two metal layers are disposed adjacent each other, as illustrated in FIG. 6. In the cross section view of FIG. 6 the conductive layers appear planar. In the illustrated embodiments the conductive layers defined by the connection tube and the tire valve stem are generally cylindrical. However, any corresponding shapes may be used for the two metal layers.

Dielectric material 610 may be disposed between tire valve stem 415 and connection tube 220. The dielectric material may be air. In that case, no additional material or layer may be needed between tire valve stem 415 and connection tube 220. In other embodiments dielectric material 610 might be plastic, or the like. In such embodiments connection tube 220 may be formed to have a plastic protective coating on one or both sides and upon engagement with tire valve stem 415, the protective coating may operate as the dielectric material. Additionally, air combined with such a protective coating may operate as the dielectric material. Another example of the dielectric material might be a plastic coating molded on tire valve stem 415. In additional embodiments, this plastic coating combined with air and/or the plastic coating on connection tube 220 to form dielectric layer 610 between tire valve stem 415 and connection tube 220. The depth of dielectric layer 610 might vary depending on a desired capacitance value of multilayer structure 600.

The physical characteristics of the components illustrated and described herein may be selected to obtain particular performance results. For example, the dielectric material may be selected to have a particular dielectric constant, or the conductive materials may be chosen to endure the harsh operating environment of the tire pressure detector. Further, electrical characteristics such as dielectric constant may be chosen to tune the performance of the tire valve as an antenna. For example, the components may act as a filter to radio frequencies impressed on the antenna. The physical construction and materials may be chosen to tailor the frequency response to minimize attenuation or maximize gain at frequencies of interest, such as 315 MHz.

Figure 7:
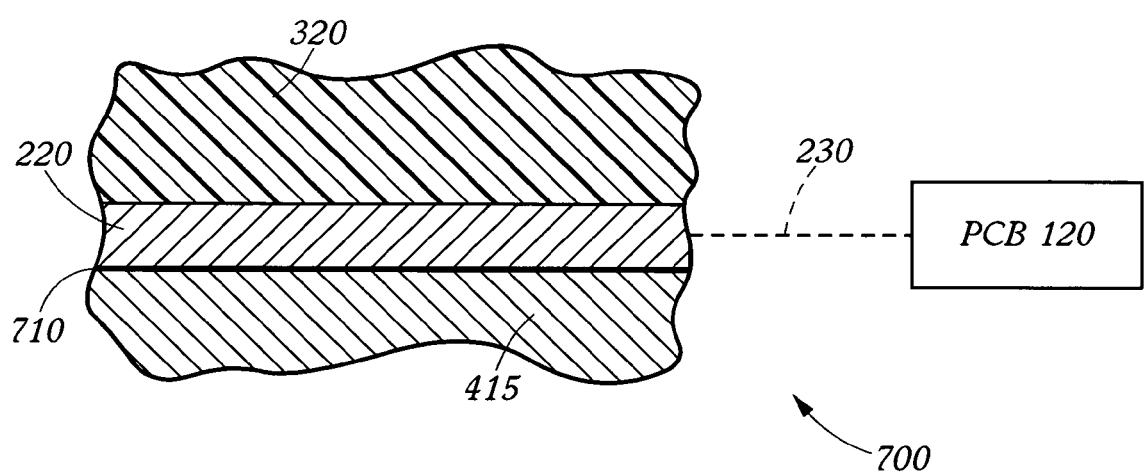
FIG. 7 illustrates another embodiment of the capacitive coupling using air as a dielectric layer.

FIG. 7 illustrates a multilayer structure 700 that uses air as a dielectric layer. In multilayer structure 700, a thin air gap may be defined at interface 710, between tire valve stem 415 and connection tube 220. For instance, when air is used as the dielectric layer, voltage across this capacitive coupling structure may be approximately 65 dBµV. Direct connection of tire valve stem 415 and connection tube 220 may be made where only a small amount of air exists between tire valve stem 415 and connection tube 220. The direct connection may provide a path that the tire data is delivered via connection tube 220 to tire valve stem 415. With the direct connection, tire valve 170 is removable when needed. If the direct connection is compromised with dust and/or salt over time, capacitive coupling may replace the direct connection. Dust and/or salt accumulated between tire valve stem 415 and connection tube 220 may operate as the dielectric layer and result in capacitive coupling between the tire valve stem and connection tube.

As a further example, a lubricant may be disposed between connector tube 220 and tire valve stem 415. In accordance with the present invention, this lubricant may be a conductive lubricant or it may be a dielectric lubricant. Thereby, if the lubricant is conductive a direct connection between the connector tube and the stem is created and may over time become capacitive, as described above. However, if the lubricant is a dielectric it may promote dielectric coupling of the connector tube and the valve stem. In either case, the lubricant can facilitate assembly, disassembly and reassembly of the tire valve with tire pressure detector 140.

Figure 8:
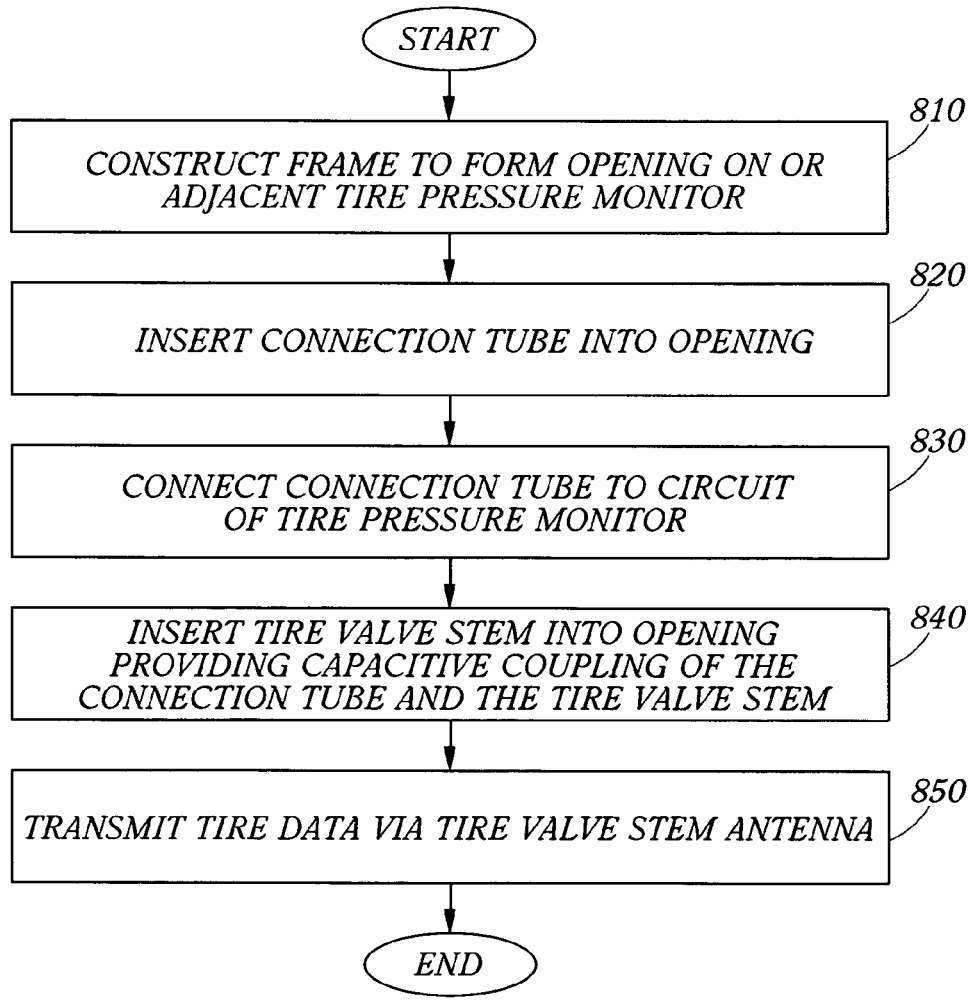
FIG. 8 is a flowchart illustrating a method for forming the capacitive coupling.

FIG. 8 is a flowchart illustrating an embodiment for forming capacitive coupling between a tire valve antenna and a connection tube in accordance with the present invention. At 810 a frame is constructed to for an opening on or adjacent to a tire pressure monitor. In the examples described above frame 320 is attached to or constructed integrally with the tire pressure detector enclosure 145. In illustrated embodiments of the tire pressure detector, frame 320 and opening 310 may be predefined, ready to receive tire valve 170. Thus, minimal manufacturing processes may be required to form capacitive coupling in accordance with the present invention. Frame 320 may have circular opening 310 in its center, for example, as shown in FIG. 3. After frame 320 and opening 310 are formed, connection tube 220 can be inserted into opening 310 at step 820. Connection tube 220 may be pressed or pushed in using force at 820, preferably minimal force. This may simplify the manufacturing process and also may reduce the manufacturing cost. However, the connection tube may be molded into or overmolded by the detector enclosure, particularly into a housing member, such as frame 320, as discussed above.

Connection tube 220 is connected to tire pressure detector 140 to receive tire data at 830. Connection tube 220 may include pin 230 extending therefrom to printed circuit board 120 of the tire pressure detector 140. In one embodiment, pin 230 may be inserted into a narrow opening, or hole, formed on enclosure 145 of tire pressure detector 140 and connected to printed circuit board 120. In other embodiments, pin 230 may extend along the enclosure of tire pressure detector 140 with potting techniques. Alternatively, connection tube 220 may be connected to printed circuit board 120 using a tag 510, which might extend from printed circuit board 120. One end of tag 510 may be secured to frame 320 or to an end of valve stem 415 using a screw or similar fastener at 830.

After connection tube 220 is coupled to printed circuit board 120, tire valve 170, particularly tire stem 415, is inserted into the opening 310 at 840. Various attachment methods are possible to attach tire valve stem 415 to tire pressure detector 140. For instance, screw attachment, interference fit, plastic overmolding, or any other methods of attachment are possible. With an air and/or plastic interface between connection tube 220 and tire valve stem 415 as a dielectric. As a result, coupling is formed between the tire valve 170 and connection tube 220. This coupling has the effect of enabling the signal at connection tube 220 to manifest itself as a signal in the receiving tire valve 170 conductor, utilizing the capacitive, inductive or a combination of the capacitive and inductive properties of the materials. Tire data is conducted from tire pressure detector 140 to connection tube 220, and thus to tire valve 170, and eventually transmitted to the central control unit via tire valve antenna 170 at 850.

As noted above, the tire pressure detector and the tire valve antenna are connected using capacitive or inductive coupling. The tire data may be transmitted via the tire valve antenna. However, the tire valve antenna may also be relatively easily removed and/or replaced without damaging or destroying any sensor unit structures such as wires. Thus the tire valve may perform both functions of antenna and a tire valve satisfactorily. The connection using capacitive coupling may be reliable and cost-effective. As long as the tire valve is inserted into the opening, a reliable and persistent connection is possible. Furthermore, the capacitive coupling is resistant to dust or salt. Due to the present invention's use of capacitive coupling dust, salt or corrosion accumulated between the tire valve and the connection tube may not affect the connection between the tire valve and the tire pressure detector. Since the present invention avoids the need to use an external planer antenna further design and structure of a tire sensor unit is simplified. The tire pressure detector may be compact and lightweight because no external antenna is needed. Additionally, no additional elements are needed to make a connection between the sensor circuitry and the tire valve antenna. For at least the foregoing reasons production cost of the tire monitor sensor unit may be substantially reduced.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tire monitor sensor unit, comprising:
   a tire pressure detector that detects tire pressure and generates tire data including pressure in the tire;
   a tire valve operable to receive the tire data form the tire pressure detector and transmit the tire data as an antenna; and
   a coupler removably coupling the tire pressure detector and the tire valve, the coupler comprising two metal layers disposed adjacent to one another, the coupler providing direct connection between the two metal layers that becomes a capacitive coupling over time; the two metal layers are provided respectively by the tire valve and a conductive connection tube between the tire valve and the tire pressure detector.

2. The tire monitor sensor unit of claim 1 wherein the coupler provides capacitive coupling between said tire pressure detector and the tire valve.

3. The tire monitor sensor unit of claim 2 wherein the two metal layers are separated by a dielectric layer.

4. The tire monitor sensor unit of claim 1, wherein the connection tube and the tire valve are inserted into an opening integrally formed with an enclosure of the tire pressure detector.

5. The tire monitor sensor unit of claim 3, wherein the dielectric layer comprises air.

6. The tire monitor sensor unit of claim 1, wherein the dielectric layer comprises a plastic coating disposed on at least one of the tire valve and the connection tube.

7. The tire monitor sensor unit of claim 1 wherein the coupler provides inductive coupling.

8. The tire monitor sensor unit of claim 1 wherein the coupler comprises a tab extending from the tire pressure detector, providing a first metal layer and the tire valve provides a second metal layer.

9. The tire monitor of claim 8 wherein the tab and the tire valve are, at least initially, separably directly coupled.

10. The tire monitor sensor unit of claim 1 wherein a first metal layer is secured to a second metal layer using a conductive fastener.

11. A method comprising:
    providing a conductive connection tube;
    inserting the connection tube into an opening defined by a housing of a tire pressure detector;
    electrically connecting the conductive tube to circuitry of the tire pressure detector;
    inserting a stem of a tire valve into the opening so that the connection tube surrounds the tire valve stem, thereby coupling the tire pressure detector circuitry and the stem of the tire valve; and
    transmitting the tire data using the tire valve stem as an antenna.

12. The method of claim 11, wherein the coupling is at least one of capacitive coupling, inductive coupling, and a direct connection between the connection tube and the tire valve stem.

13. The method of claim 11, further comprising forming a dielectric layer between the stem of the tire valve and the connection tube.

14. The method of claim 13, wherein the dielectric layer comprises air.

15. The method of claim 11, further comprising applying a plastic coating on at least one of the connection tube or the stem of the tire valve.

16. The method of claim 11, wherein the inserting the connection tube into the opening defined by the housing of the tire pressure detector comprises molding the housing about the connection tube.

17. The method of claim 11, wherein the coupling is direct connection between the connection tube and the stem and the direct connection becomes a capacitive coupling over time.

* * * * *